United States Patent
Taranta (10) Patent No.: US 10,503,597 B2
(45) Date of Patent: Dec. 10, 2019

(54) SYMBOL-LEVEL DECLUSTERING OF RAID STRIPES TO ISOLATE DATA CORRUPTION

(71) Applicant: Seagate Technology LLC, Cupertino, CA (US)

(72) Inventor: Eugene Taranta, Casselberry, FL (US)

(73) Assignee: Seagate Technology LLC, Cuprtino, CA (US)

( * ) Notice: Subject to any disclaimer, the term of this patent is extended or adjusted under 35 U.S.C. 154(b) by 121 days.

(21) Appl. No.: 15/711,186

(22) Filed: Sep. 21, 2017

(65) Prior Publication Data
US 2019/0087271 A1    Mar. 21, 2019

(51) Int. Cl.
| | | |
|---|---|---|
| G06F 11/10 | (2006.01) | |
| G06F 3/06 | (2006.01) | |
| G06F 16/13 | (2019.01) | |

(52) U.S. Cl.
CPC .......... *G06F 11/1088* (2013.01); *G06F 3/064* (2013.01); *G06F 3/067* (2013.01); *G06F 3/0611* (2013.01); *G06F 16/13* (2019.01)

(58) Field of Classification Search
CPC ............. G06F 11/0793; G06F 11/0751; G06F 11/0775; G06F 11/0703; G06F 3/0689; G06F 3/0653; G06F 3/067; G06F 3/0652
See application file for complete search history.

(56) References Cited

U.S. PATENT DOCUMENTS

| | | | |
|---|---|---|---|
| 6,851,082 B1 | 2/2005 | Corbett | |
| 6,928,578 B2 * | 8/2005 | Archibald, Jr. ..... | G06F 11/1076 711/114 |
| 8,443,153 B1 | 5/2013 | Edwards et al. | |
| 9,405,623 B2 * | 8/2016 | Taranta, II ......... | G06F 11/1076 |
| 10,025,667 B2 * | 7/2018 | Wu ..................... | G06F 3/0619 |
| 2002/0169995 A1 * | 11/2002 | Archibald, Jr. ..... | G06F 11/1076 714/6.12 |
| 2015/0089282 A1 * | 3/2015 | Taranta, II ......... | G06F 11/1076 714/6.24 |
| 2015/0254008 A1 * | 9/2015 | Tal ...................... | G06F 3/0619 711/114 |
| 2016/0342360 A1 * | 11/2016 | Tal ...................... | G06F 3/0619 |

OTHER PUBLICATIONS

Holland et al., "Parity Declustering for Continuous Operation in Redundant Disk Arrays", Proceedings of the 5th Conference on Architectural Support for Programming Languages and Operating Systems, 1992, 13 pages.

* cited by examiner

*Primary Examiner* — Nadeem Iqbal
(74) *Attorney, Agent, or Firm* — Mueting, Raasch & Gebhardt, P.A.

(57) ABSTRACT

Data targeted for storage into a drive array is divided into codewords with data and parity symbols. The symbols of the codewords are randomly distributed across a stripe of the drive array. One or more drives affected by data corruption are found based on a probability that a subset of inconsistent codewords intersects the one or more drives.

17 Claims, 5 Drawing Sheets

|         | DISK 1 | DISK 2 | DISK 3 | DISK 4 | DISK 5 | DISK 6 |
|---------|--------|--------|--------|--------|--------|--------|
| Offset 1 | 7 | 7 | 5 | 6 | 3 | 2 |
| Offset 2 | 4 | 6 | 4 | 5 | 2 | 3 |
| Offset 3 | 2 | 3 | 1 | 0 | 4 | 6 |
| Offset 4 | 1 | 1 | 6 | 1 | 5 | 7 |
| Offset 5 | 8 | 4 | 3 | 7 | 0 | 0 |
| Offset 6 | 5 | 0 | 2 | 8 | 8 | 8 |

*FIG. 5*

|         | DISK 1 | DISK 2 | DISK 3 | DISK 4 | DISK 5 | DISK 6 |
|---------|--------|--------|--------|--------|--------|--------|
| Offset 1 | 7 | 7 | 5 | 6 | 3 | 2 |
| Offset 2 | 4 | 6 | 4 | 5 | 2 | 3 |
| Offset 3 | 2 | 3 | 1 | 0 | 4 | 6 |
| Offset 4 | 1 | 1 | 6 | 1 | 5 | 7 |
| Offset 5 | 8 | 4 | 3 | 7 | 0 | 0 |
| Offset 6 | 5 | 0 | 2 | 8 | 8 | 8 |

| Frequency | 4 | 3 | 3 | 3 | 1 | 1 |
|-----------|---|---|---|---|---|---|

*FIG. 6*

```
def inconsistency_probability(
        layout,
        corruption_probs):
    """ """
    # We have len(probs) disk failures. Calculate the
    # probability of each scenario, where a codeword
    # intersects a different number of corrupted disks.
    total = 0.0
    failure_cnt = len(corruption_probs)
    for intersection_cnt in range(failure_cnt + 1):
        M = layout.P - 1        # Total number of objects
        n = layout.N - 1        # Number of codeword objects
        N = failure_cnt         # Number of corruptions
        rv = hypergeom(M, n, N) # Random variable from hypergeometric distribution
        if intersection_cnt == 0:
            continue
        # Iterate through each corruption pattern
        for corruption_selection in product([0, 1], repeat = intersection_cnt):
            if sum(corruption_selection) % 2 == 0:
                continue
            scenario_p = 0.0
            cnt = 0.0
            for probs in combinations(corruption_probs, intersection_cnt):
                cnt += 1.0
                p = 1.0
                for prob, is_corrupt in zip(probs, corruption_selection):
                    p *= prob if is_corrupt else 1.0 - prob
                scenario_p += p
            scenario_p *= 1.0/cnt
            total += scenario_p * rv.pmf(intersection_cnt)
    return total ©Copyright 2017, Seagate Technology LLC
```

*FIG. 7*

FIG. 8

SYMBOL-LEVEL DECLUSTERING OF RAID STRIPES TO ISOLATE DATA CORRUPTION

SUMMARY

The present disclosure is directed to symbol-level declustering of RAID stripes, e.g., to isolate silent data corruption. In one embodiment, data targeted for storage into a drive array is divided into codewords. Each of the codewords has a first set of data symbols and a second set of parity symbols. The symbols of the codewords are randomly distributed across a stripe of the drive array such that no two symbols from the same codeword map to the same drive. An inconsistent set of the codewords due to data corruption of one or more sectors of the drive array is found. For each drive of the drive array, a probability is found that a subset of the inconsistent set stored on the drive is due to the drive failing. One or more drives affected by data corruption are found based on the probabilities.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to identifying and correcting silent data corruption that occurs on persistent data storage devices such as arrays of hard disk drives (HDD) and solid-state drives (SSD). Silent data corruption (SDC) is a condition that occurs when data read from storage without error is inconsistent with that previously written. Stochastic processes, in combination with increasing product complexity, escalate the likelihood of encountering SDC. A paper from the European Organization for Nuclear Research (CERN) in 2007 reported on the prevalence of SDC throughout their large scale storage system, highlighting the extent of this problem.

Practitioners have since put considerable effort into addressing the issue of SDC. For example, the T10 Data Integrity Field (DIF) solution has gained significant traction. Systems utilizing T10 DIF extend each disk sector with auxiliary protection information so that hardware, software, and/or firmware can validate data correctness on both ends of the data transmission channel, and thereby detect and possibly correct data corruption. In another approach, systems utilizing redundant array of independent disks (RAID) can validate data correctness by performing a full stripe read and consistency check for each data retrieval operation. Given a singly redundant array, e.g., a RAID 5 or degraded RAID 6, the system can at least detect data corruption. With two or more checksums, e.g., a non-degraded RAID 6, the system can also correct silent corruption. However, both solutions require additional space to store sufficient information for SDC recovery, thereby reducing the usable storage capacity.

More precisely, for every two available redundancies in a stripe, RAID can isolate and correct one corruption. Therefore, with double parity RAID 6, degraded array SDC corrections are not possible. And so while RAID 6 has been widely adopted to protect against latent sector errors identified during recovery, without T10 DIF, SDC remains problematic. Triple parity can overcome this issue for single disk erasure scenarios, but this further impacts useable storage capacity.

Embodiments described below decluster parity at the codeword symbol level to increase data dispersion. One consequence of this layout design is the ability to recognize corrupt sectors within an encoded stripe, something that today is only possible when utilizing auxiliary information such as that provided by T10 DIF and multi-parity RAID. One feature in these embodiments that allows recognizing corruption within a stripe is that a single corrupt sector intersects every corrupt codeword, whereas uncorrupted sectors only intersect a subset of corrupt codewords in a sub-sector declustering design. This makes silent data corruption detection and correction viable via a straightforward bin counting algorithm. Even when multiple sectors are corrupt, detection and isolation of such sectors is possible using a probabilistic approach.

In one embodiment, a randomized data layout design is used that induces an identifiable pattern when a sector becomes corrupt. This approach requires only a single redundancy. Thus, this is a space-efficient approach to isolating silent data corruption. The layout design is of theoretical interest that overcomes some error correcting code limitations. For purposes of this disclosure, the term 'sector' is intended to represent the smallest block size that is individually addressable by a storage device, and may apply to non-disk media such as SSDs. In SSDs, the smallest individually addressable block is often referred to as a page, and so any references to sectors in this application may be considered equally applicable to pages or other nomenclature used in different storage types.

For purposes of the following discussion, a code is a set of rules that transforms information in a way that is appropriate for encryption, compression, error detection/correction, etc. The smallest unit of information in a code is an s-bit symbol. A codeword, in the context of error correcting codes, is a set of n symbols of which k symbols are data and m symbols (m=n-k) are checksums (parity). A RAID 6 array uses m=2, and the symbol size is often one byte, s=8. For purposes of this disclosure, it is assumed that a sector of the drive array holds multiple symbols, such that sector size >s. A maximum distance separable code transforms data into codewords such that any m erasures can be regenerated from the remaining k symbols. Layout designs for RAID ensure that each codeword symbol maps to a different disk so that a system can tolerate m failures, which may be complete disk losses, unrecoverable read errors, or combinations thereof.

When designing a layout, there are n-factorial possible permutations for any n-length codeword. Modern architectures divide storage devices into chunks of contiguous logical blocks, and each disjoint subset of n-chunks across n-devices forms a stripe, which stores a group of codewords using identical permutations. For instance, a 4 KB chunk stores 4096 eight-bit symbols, and a stripe of n-chunks across n-unique devices stores 4096 codewords using a homogenous symbol permutation strategy. The codeword length may match the drive pool count p, such as with a traditional RAID 5, and the layout design may further rotate party symbols in a round robin fashion between consecutive stripes. Or the design might decluster parity when the codeword length is less than the pool size (n<p), and stripe chunks are pseudo-randomly distributed over the pool. The embodiments described below also allow declustering within a stripe, down to the symbol level, thereby allowing heterogeneous permutations across device sectors. This design can be used to isolate silently corrupted sectors.

Figure 1:
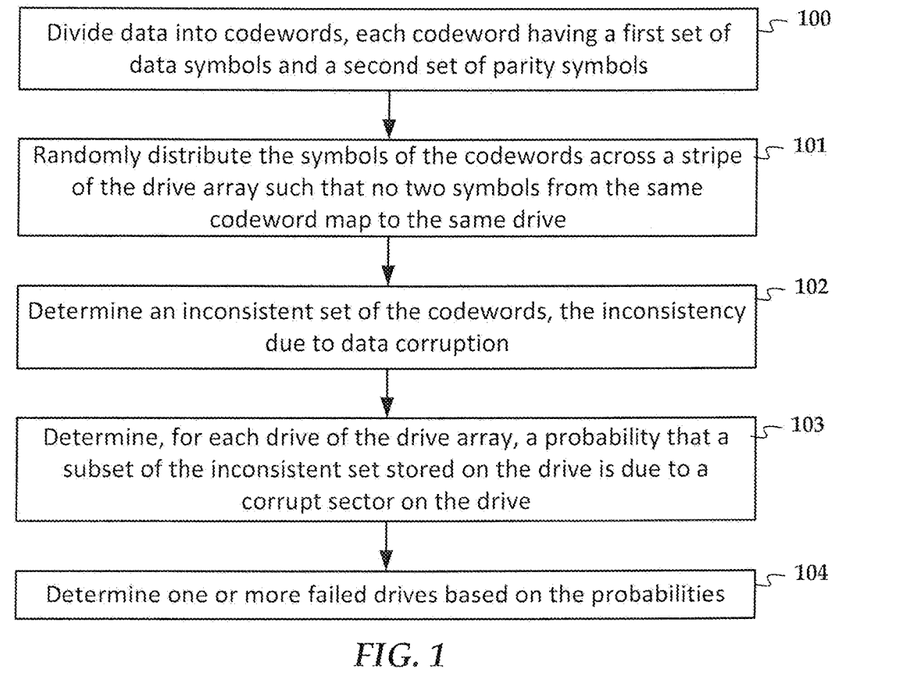
FIG. 1 is a flowchart of a method according to an example embodiment.

In FIG. 1, a flowchart illustrates a method according to an example embodiment. Data targeted for storage into a drive array is divided 100 into codewords, each of the codewords having a first set of data symbols and a second set of parity symbols. The symbols are randomly distributed 101 across a stripe of the drive array such that no two symbols from the same codeword map to the same drive. As will be described in detail below, the stripe includes a chunk of one or more sectors on each drive, symbols from a set of codewords are randomly distributed across the chunks such that any given sector can have both parity and data symbols randomly selected from the set of codewords.

Figure 2:
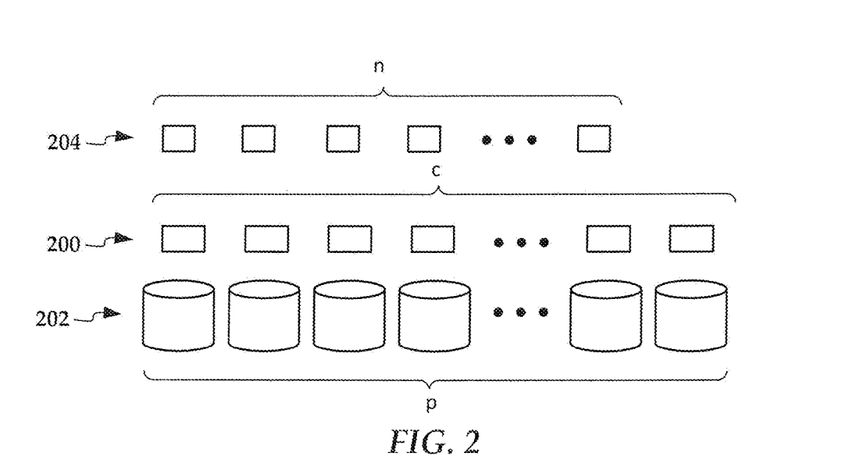
FIG. 2 is a block diagram of a symbol declustering layer according to an example embodiment.

An inconsistent set of the codewords is determined 102, e.g., during a read operation as part of servicing a client I/O request or as part of a background scan operation. The inconsistency is due to data corruption. For each drive of the drive array, a probability is determined 103 that a subset of the inconsistent set stored on the drive is due to the drive having silently corrupt data. This at least involves finding a set of the drives which have symbols belonging to the inconsistent set of codewords. One or more failed drives are determined 104 based on the probabilities In FIG. 2, a block diagram illustrates a symbol declustered layout according to an example embodiment. A stripe 200 is c chunks wide with codeword length n≤c<=p, where p is the count of drives in the pool 202. The stripe's chunk size is the smallest capacity that allows the stripe to store an integral number of sectors and codewords. To illustrate, say that the sector size is 512 B, the stripe width is c=12, the symbols size is one byte, and the codeword length is n=10, such as with an 8+2 RAID 6-like configuration. The chunk size in such a case is 5 sectors, and is found as follows.

Figure 3:
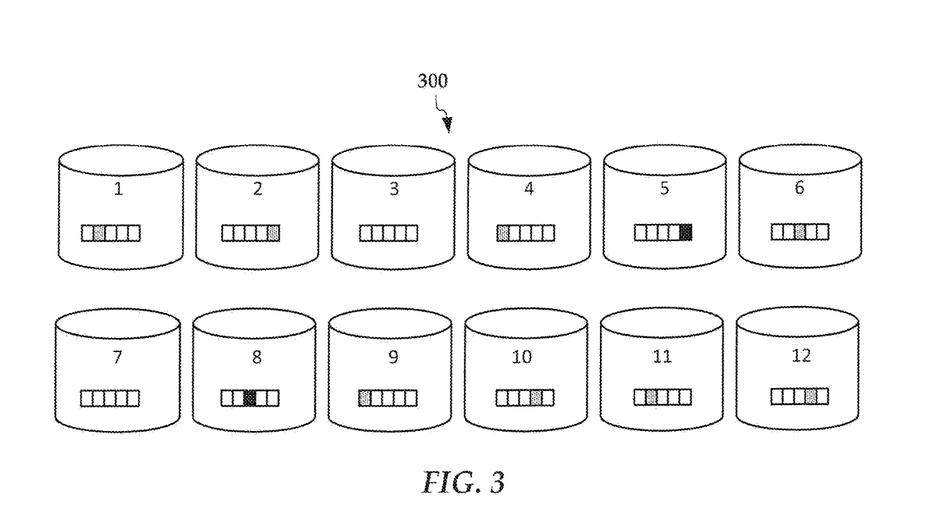
FIGS. 3 and 4 are block diagrams of a RAID stripe according to example embodiments.

First, the least common multiple (LCM) is found for the stripe size of 12 disks*4096 bits per sector=49152 bits. There are 80 bits per codeword (n*s), so LCM(49152, 80)=245760 bits. This results in 20480 bits per disk (245760 bits/12 disks) which equals 5 sectors per disk (20480 bits per disk/4096 bits per sector). This example is shown in FIG. 3, in which an array of 12 disks 300 shown. The rectangles in the figure represent a stripe within the array, each rectangle representing one sector.

Figure 4:
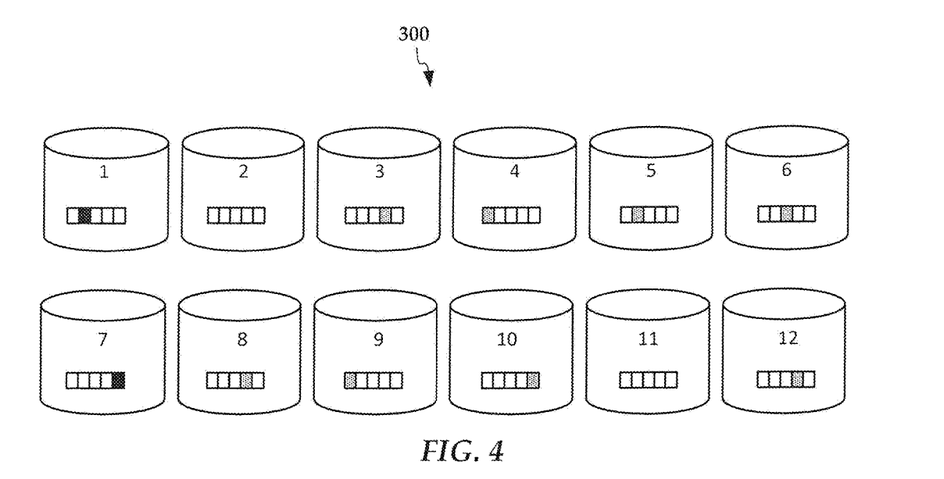

Within the stripe, all individual codewords are randomly distributed such that each symbol is mapped to a different drive; no two symbols from the same codeword map to the same drive. This restriction ensures there is, at most, one erasure per codeword when a failure occurs. In FIG. 3, shaded boxes represent sectors that each contain one symbol from a single codeword. The lighter shading (disks 1-4, 6 and 9-2) represents sectors that store data symbols of the codeword, and a darker shading (disks 5 and 8) represents sectors that store parity of the codeword. In FIG. 4, a diagram of the same array 200 shows distribution of symbols of a second, different codeword. Note that each sector may include a random collection of data and parity symbols selected from the entire set of codewords mapped to this stripe. This differs from existing striping arrangements (including existing declustered parity arrangements), in which sectors contain either all parity or all data. In this example, the set of codewords in this stripe includes 245760/80=3072 different codewords, the symbols of which are randomly distributed among the 12 chunks.

Figure 5:
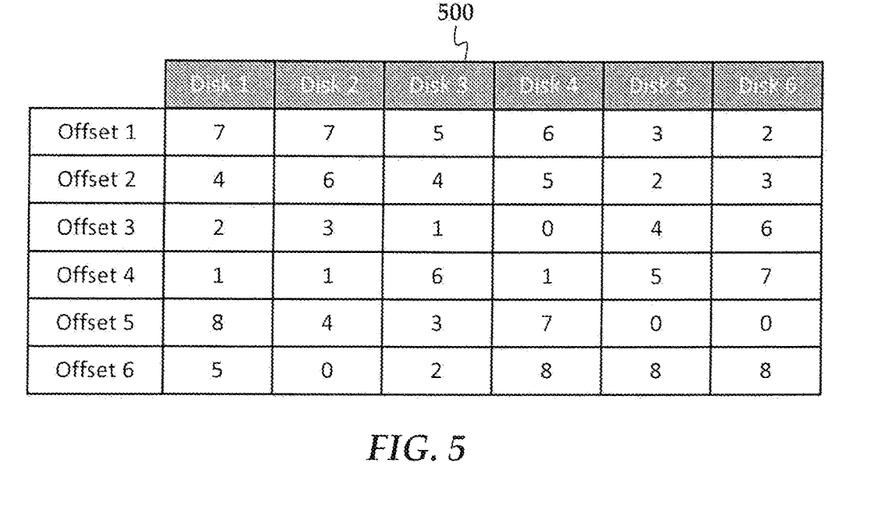
FIGS. 5 and 6 are block diagrams of a RAID stripe according to example embodiments.

In FIG. 5, a block diagram illustrates an array layout according to another example embodiment. In this example, the table 500 represents a single stripe of six chunks mapped to six disks. This example is kept simple for purposes of illustration, with symbol size s=1 bit and sector size of 6 bits. The codeword length is n=4 with m=1 so that this corresponds to a 3+1 RAID 5-like configuration. Each cell in the table 500 indicates its codeword membership. It can be seen that the codeword symbols appear to be randomly distributed within the stripe, even given the constraint that each codeword maps to n=4 unique disks.

Figure 6:
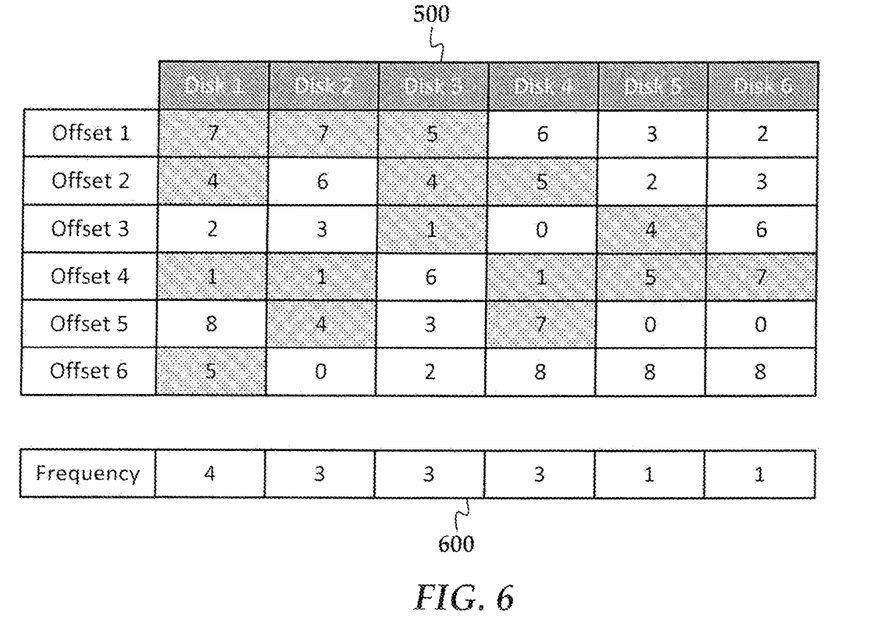

In FIG. 6, the table 500 of FIG. 5 is shown, with shaded cells indicating a corrupted codeword. In this case, Disk 1 is corrupt which results in four bit flips in codewords 1, 4, 5, and 7, and affects the rest of the chunks as indicated by the shaded cells in Disks 2-6. Also seen in FIG. 6 is a row 600 with frequency bins that indicate how many corrupted codewords intersect each drive. In most cases, the drive's bin with the highest count is the corrupted disk.

The corruption in Disk 1 results in four codewords being inconsistent. These four codewords intersect Disk 1, but only smaller subsets intersect the remaining disks. Thus, to isolate silent data corruption, the inconsistent codeword intersections can be tracked using per drive frequency bins. Without having exact knowledge of the underlying problem, these frequencies help paint a picture. In this example, Disk 1's inconsistent codeword intersection frequency totals four, which is more than any other drive. This evidence suggests that Disk 1 is likely the corruption culprit.

However, when a corruption occurs, there are a number of possible alternative explanations. Perhaps four disks are corrupt, each flipping one bit across each codeword. Or, perhaps two disks are corrupt, each corrupting two bits that are, again, spread across the four codewords. These alternative explanations do seem less probable, but are not impossible. As such, when encountering inconsistent codewords as shown in FIG. 6, a number of hypotheses may be formed and the most probable outcome is accepted when there is a sufficient margin between this hypothesis and the alternative hypotheses.

A more specific example of how these hypotheses can be formed and evaluated is discussed below. A variable $H_i$ is defined as the observed frequency distribution due to failures $F_i$, with symbol corruption probabilities $p_i$. The variable i indexes the N hypotheses ($1 \le i \le N$); $F_i$ is the set of failed disk for hypothesis i; and $p_i$ are the symbol corruption probabilities for each disk in $F_i$. Note that the probability of a symbol corruption depends, in part, on the cross entropy between the expected and actual data distribution, which is an unknowable quantity that can be estimated (discussed in greater detail below). Since multiple hypotheses may have high probabilities, ambiguous situations are recognized in order to minimize false positives. For this reason, only the maximum hypothesis, $H_M|m=\text{argmax}(H_i)$ is accepted, when the margin between probabilities are sufficiently large, as shown in Equation (1) below, where $0 \le \delta \le 1$ is the rejection threshold.

$$\frac{H_m}{\sum_{i=1}^{N} H_i} \geq \delta \quad (1)$$

Each hypothesis supposes a specific subset of drives is corrupt, which gives one hypothesis for every failure combination, as shown in Equation (2) below.

$$\text{Total Hypotheses} = \sum_{i=1}^{c} \binom{c}{i} \quad (2)$$

Recall that $$\binom{c}{i}$$

in Equation (2) denotes the binomial coefficient and represents the number of ways that i-disks can be selected from c-disks when order is irrelevant For even reasonably sized stripes, the hypotheses count is large. With stripe size c=10, for example, there are 1022 hypotheses. Some of the possibilities can be culled by assuming that, at most, only two or three drives are corrupt, e.g., perhaps as part of a botched partial full stripe write, which reduces the count to 55 in this example.

Once the subset of hypotheses is selected, the symbol corruption probabilities for each hypothesis can be selected. At first glance, it may seem sufficient to assume that a symbol is corrupt with probability $p=1-1/s$, which is the likelihood that a symbol is overwritten with a different symbol. But this approach makes an assumption that data possesses high entropy and is therefore uniformly random. In fact, the data may be highly redundant such as with text, or the data may be sparse such as with typical data structures, which suggests a different approach. One solution is to count corruptions in the pairwise disjoint codeword subsets. Given a single disk failure from a set of failures (the hypothesis), those codewords are identified that intersect only the given disk, and not any other disk in the failure set. From this disjoint codeword subset, all corrupt codewords are counted, after which their ratio (corruptions/subset size) is the symbol corruption probability estimate $p_i$ for disk i.

Figure 7:
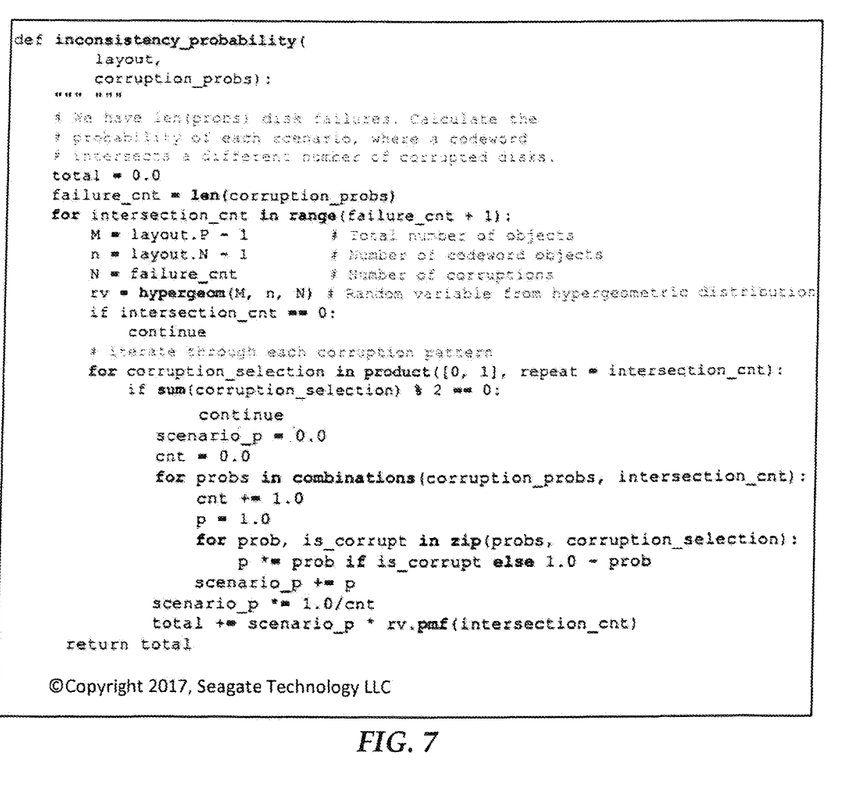
FIG. 7 is a code listing of a probability-determining procedure according to another example embodiment.

With the disk failure set and corruption probabilities determined, the expected frequency bin counts can be estimated. The number of inconsistent codewords that intersect a specific drive depends on both the probability of other corrupted disks intersecting its codewords and the probability of those symbols being corrupt. In FIG. 7, a code listing presents a calculation of these probabilities according to an example embodiment. The listing in FIG. 7 is Python code that calculates the probability of a single codeword on a non-corrupt drive being inconsistent based on a RAID 5-like configuration corruption hypothesis. This can be extended to support more complex error correcting codes. The case for when a disk being evaluated is also corrupt, according to the hypothesis, is similar enough that the details are omitted.

Once the expected frequencies of inconsistent codewords intersecting each drive are found, as well as the observed frequencies, Pearson's chi-squared goodness of fit test can be used to measure how well the observations fit the expectations, as shown in Equation (3) below, where $O_j$ is the observed frequency for disk j, and $E_j$ is expected frequency for disk j. The probability (p-val) of $x^2$ with n−1 degrees of freedom can be looked up, which is the probability of the given hypothesis $H_i$. Thereafter, all the hypotheses can be evaluated per Equation (1) to find the most likely. This can then be used to perform mitigation/repair, e.g., flag one or more disks as exhibiting SDC, leading to corrective measures such as disk replacement, data refresh, etc.

$$x^2 = \sum_{i=1}^{c} \frac{(O_j - E_j)^2}{E_j} \quad (3)$$

Figure 8:
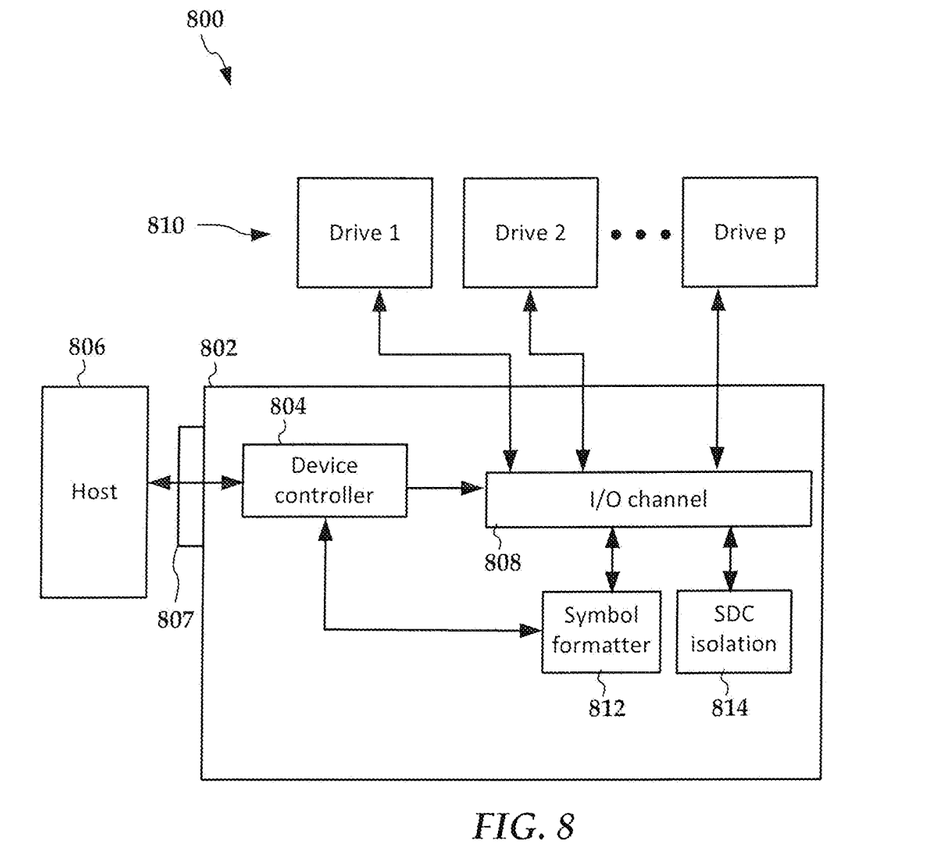
FIG. 8 is a block diagram of a storage system according to an example embodiment.

In FIG. 8, a diagram illustrates components of a data storage system 800 according to an example embodiment. The system 800 includes circuitry 802 (e.g., a controller card) with a device controller 804 that processes read and write commands and associated data from a host device 806 via a host interface 807. The host interface 807 includes circuitry that enables electronic communications via standard protocols (e.g., SATA, SAS, PCIe, SCSI, Ethernet, etc.). The host device 806 may include any electronic device that can be communicatively coupled to store and retrieve data from a data storage device, e.g., a computer, a server, a storage controller. The device controller 804 includes an input/output channel 800 that is coupled to one or more input output channels 808 that reads from and writes to an array 810 of storage drives. The array 810 may also use electrical interfaces and protocols similar to that of the host interface 807.

A symbol formatter 812 is a functional component (e.g., software or firmware module, logic device) that manages distribution of host data among the drive array 810. For example, the symbol formatter 812 receives blocks of incoming data associated with write requests, breaks the blocks into the appropriate number of data symbols, calculates parity data, and distributes the symbols randomly among one or more stripes of the array 810. The symbol formatter 812 may also maintain mapping between host logical addresses and logical addresses used to store codeword symbols on the drives. When servicing read requests from the host 806, the symbol formatter 812 provides a lookup of the drive array logical addresses corresponding to codewords associated with logical addresses provided by the host 806. The codewords and read from the array 810 and data and parity of the codewords can be checked to detect and correct errors.

If errors in particular codewords are found in response to host read requests or other operations (e.g., a background scan of the array), an SDC isolation module 814 can analyze characteristics of the failures to identify drives that may be failing, such drive being targeted for error correction/mitigation procedures. The SDC isolation module 814 may determine an inconsistent set of the codewords due to data corruption of one or more sectors of the drive array 810. In response, a plurality of hypotheses are formulated, each hypothesis determining a probability that the symbol corruptions are due to failures on a respective subset of the drives. A maximum hypotheses whose probabilities exceed that of other hypotheses by a rejection threshold is determined. In response, mitigation is performed on the subset of drives identified associated with the maximum hypotheses.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
dividing data targeted for storage on a drive array into codewords, each of the codewords having a first set of data symbols and a second set of parity symbols, the symbols having a size less than a sector size of the drive array;
randomly distributing the symbols of the codewords across a stripe of the drive array such that no two symbols from the same codeword map to the same drive;
determining an inconsistent set of the codewords due to data corruption of one or more sectors of the drive array;
determining, for each drive of the drive array, a probability that a subset of the inconsistent set stored on the drive is due to the drive failing, the determination of each probability involving:
identifying a disjoint codeword subset that comprises codewords that only intersect the drive and not any other drives that store inconsistent codewords;
counting corruptions in the pairwise disjoint codeword subsets; and
determining the probability based on a ratio of the corruptions verses the subset size; and
determining one or more drives affected by data corruption based on the probabilities.

2. The method of claim 1, wherein the stripe comprises a plurality of chunks each associated with a particular drive of the drive array, wherein a size of each chunk corresponds to a smallest capacity that allows the stripe to store an integral number of sectors and codewords.

3. The method of claim 1, wherein the parity symbols provide single redundancy.

4. The method of claim 1, wherein each sector of the stripe includes a random collection of both the data symbols and the parity symbols.

5. The method of claim 1, wherein determining the one or more drives affected by data corruption based on the probabilities comprises selecting a maximum hypothesis whose probability exceeds that of other hypotheses by a rejection threshold $\delta$.

6. The method of claim 1, wherein the size of the symbols is one byte.

7. A system comprising:
an array of data storage drives;
a controller coupled to the array of data storage drives and configured to perform:
dividing data targeted for the array into codewords, each of the codewords having a first set of data symbols and a second set of parity symbols, each sector of the array storing a plurality of symbols;
randomly distributing the symbols of the codewords across a stripe of the array such that no two symbols from the same codeword map to the same drive;
determining an inconsistent set of the codewords due to data corruption of one or more sectors of the drive array;
determining, for each drive of the array, a probability that a subset of the inconsistent set stored on the drive is due to the drive failing, the determination of each probability involving:
identifying a disjoint codeword subset that comprises codewords that only intersect the drive and not any other drives that store inconsistent codewords;
counting corruptions in the pairwise disjoint codeword subsets; and
determining the probability based on a ratio of the corruptions verses the subset size; and
determining one or more drives affected by data corruption based on the probabilities.

8. The system of claim 7, wherein the stripe comprises a plurality of chunks each associated with a particular drive of the drive array, wherein a size of each chunk corresponds to a smallest capacity that allows the stripe to store an integral number of sectors and codewords.

9. The system of claim 7, wherein the parity symbols provide single redundancy.

10. The system of claim 7, wherein each sector of the stripe includes a random collection of both the data symbols and the parity symbols.

11. The system of claim 7, wherein determining the one or more drives affected by data corruption based on the probabilities comprises selecting a maximum hypothesis whose probability exceeds that of other hypotheses by a rejection threshold $\delta$.

12. The system of claim 7, wherein the size of the symbols is one byte.

13. A method comprising:
dividing an array of drives into stripes;
for each stripe, declustering individual symbols of codewords across the stripe, the symbols comprising a first set of data symbols and a second set of parity symbols, each sector of the stripe storing a random collection of both the data symbols and the parity symbols;
determining an inconsistent set of the codewords due to data corruption of one or more sectors of the drive array;
determining a plurality of hypotheses that symbol corruptions are due to failures on a respective subsets of the drives, the determination of each hypothesis involving, for each drive in the subset:

identifying a disjoint codeword subset that comprises codewords that only intersect the drive and not any other drives that store inconsistent codewords;

counting corruptions in the pairwise disjoint codeword subsets; and determining the probability based on a ratio of the corruptions verses the subset size;

determining a maximum hypothesis whose probability exceeds that of other hypotheses by a rejection threshold; and performing mitigation on the subset of drives identified associated with the maximum hypotheses.

14. The method of claim 13, wherein the subset of the drives is limited to three or fewer drives to reduce a number of the hypotheses.

15. The method of claim 13, wherein each stripe comprises a plurality of chunks each associated with a particular drive of the drive array, wherein a size of each chunk corresponds to a smallest capacity that allows the stripe to store an integral number of sectors and codewords.

16. The method of claim 13, wherein the parity symbols provide single redundancy.

17. The method of claim 13, wherein a size of the symbols is one byte.

* * * * *